(12) United States Patent
Geng

(10) Patent No.: US 10,481,472 B2
(45) Date of Patent: Nov. 19, 2019

(54) METHOD AND DEVICE FOR PROJECTION PARAMETER ADJUSTMENT AND PROJECTION APPARATUS

(71) Applicant: BOE Technology Group Co., Ltd., Beijing (CN)

(72) Inventor: Lihua Geng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/743,422

(22) PCT Filed: Apr. 17, 2017

(86) PCT No.: PCT/CN2017/080761
§ 371 (c)(1),
(2) Date: Jan. 10, 2018

(87) PCT Pub. No.: WO2017/215337
PCT Pub. Date: Dec. 21, 2017

(65) Prior Publication Data
US 2018/0203335 A1 Jul. 19, 2018

(30) Foreign Application Priority Data

Jun. 17, 2016 (CN) .......................... 2016 1 0440089

(51) Int. Cl.
*G03B 21/14* (2006.01)
(52) U.S. Cl.
CPC ......... *G03B 21/142* (2013.01); *G03B 21/145* (2013.01)
(58) Field of Classification Search
CPC ..................... G03B 21/2053; H04N 9/3155
See application file for complete search history.

(56) References Cited

U.S. PATENT DOCUMENTS

| 2007/0172122 A1* | 7/2007 | Kouno | ................. G06K 9/2063 |
| | | | 382/175 |
| 2012/0127439 A1* | 5/2012 | Lin | .................... G03B 21/2053 |
| | | | 353/87 |
| 2016/0269701 A1* | 9/2016 | Guo | ..................... H04N 9/3182 |

FOREIGN PATENT DOCUMENTS

| CN | 102749794 A | 10/2012 |
| CN | 102929084 A | 2/2013 |

(Continued)

OTHER PUBLICATIONS

First Office Action dated Mar. 31, 2017 corresponding to Chinese application No. 201610440089.2.

(Continued)

*Primary Examiner* — Ryan D Howard
*Assistant Examiner* — Danell L Owens
(74) *Attorney, Agent, or Firm* — Nath, Goldberg & Meyer; Joshua B. Goldberg; Daniel Bissing

(57) ABSTRACT

There is provided a method and device for projection parameter adjustment and a projection apparatus. The method comprises adjusting a projector in accordance with predetermined patterns sequentially, wherein the predetermined patterns correspond to respective projection parameters. For each predetermined pattern, step of adjusting the projector according to the predetermined pattern includes: controlling the projector to display the predetermined pattern in accordance with a predetermined display condition corresponding to the predetermined pattern; measuring luminance of predetermined positions in a theoretical display area of the projector in accordance with the predetermined measurement condition; judging whether the predetermined pattern matches with the theoretical display region in accordance with the luminance; and under the condition the predetermined pattern does not match with the theoreti- (Continued)

cal display area, adjusting the projector and repeating above steps until the predetermined pattern matches with the theoretical display area.

16 Claims, 5 Drawing Sheets

(56) References Cited

FOREIGN PATENT DOCUMENTS

| | | | |
|---|---|---|---|
| CN | 103338342 A | 10/2013 |
| CN | 104363399 A | 2/2015 |
| CN | 104635408 A | 5/2015 |
| CN | 104730824 A | 6/2015 |
| CN | 105652576 A | 6/2016 |
| CN | 105867055 A | 8/2016 |
| JP | 200833302 A | 2/2008 |
| JP | 201457237 A | 3/2014 |
| WO | 2012085990 A1 | 6/2012 |

OTHER PUBLICATIONS

International Search Report dated Jul. 12, 2017 corresponding to application No. PCT/CN2017/080761.

* cited by examiner

METHOD AND DEVICE FOR PROJECTION PARAMETER ADJUSTMENT AND PROJECTION APPARATUS

CROSS-REFERENCE TO RELATED APPLICATION

This is a National Phase Application filed under 35 U.S.C. 371 as a national stage of PCT/CN2017/080761, filed on Apr. 17, 2017, an application claiming the benefit of priority from Chinese Patent Application No. 201610440089.2, filed on Jun. 17, 2016, the entire disclosure of which is incorporated herein by reference.

FIELD OF THE INVENTION

The present disclosure relates to the field of projection technologies, and more particularly, to a method for projection parameter adjustment, a device for projection parameter adjustment for implementing the method, and a projection apparatus including the device for projection parameter adjustment.

BACKGROUND OF THE INVENTION

In daily life, projection technologies and projectors have been widely used. Usually, the installation of the projection apparatus may make a significant impact on the final projection imaging effect.

In order to obtain a better imaging effect, usually the installation position of the projector may be manually adjusted in advance. However, due to the low accuracy of manual adjustment and the inferior operational convenience, the adjustment efficiency is lowered.

SUMMARY OF THE INVENTION

As one aspect of the present disclosure, there is provided a method for projection parameter adjustment, comprising:
adjusting a projector in accordance with a plurality of predetermined patterns sequentially, wherein each of the predetermined patterns corresponds to a projection parameter, and for each predetermined pattern, the step of adjusting the projector according to the predetermined pattern includes:
Step S1, controlling the projector to display the predetermined pattern in accordance with a predetermined display condition corresponding to the predetermined pattern;
Step S2, measuring luminance of a plurality of predetermined positions in a theoretical display area of the projector in accordance with the predetermined measurement condition;
Step S3, judging whether the predetermined pattern matches with the theoretical display region in accordance with the luminance of the plurality of predetermined positions; and
Step S4, under the condition the predetermined pattern does not match with the theoretical display area, adjusting the projector and repeating Step S1 to Step S3 until the predetermined pattern matches with the theoretical display area.

In one embodiment of the present disclosure, the step of adjusting the projector comprises: adjusting a position where the projector is placed.

In one embodiment of the present disclosure, the projection parameter comprises a position where the projector is placed, and the predetermined patterns include a first predetermined pattern in a rectangular shape having a first predetermined luminance, and wherein
Step S1 comprises: controlling the projector to display the first predetermined pattern under the condition the projector being in a state of the maximum focal length;
Step S2 comprises: measuring the luminance of each predetermined position, respectively;
Step S3 comprises: determining that the first predetermined pattern does not match with the theoretical display area under the condition there is a position in the plurality of predetermined positions where the luminance is less than the first predetermined luminance; and determining that the first predetermined pattern matches with the theoretical display area under the condition the luminance of the plurality of predetermined positions is greater than or equal to the first predetermined luminance.

In one embodiment of the present disclosure, the projection parameter comprises an angle at which the lens of the projector rotates about the axis of the lens, the predetermined patterns include a second predetermined pattern which is a part of the first predetermined pattern, and a connecting line of at least two predetermined positions in the plurality of predetermined positions is parallel to the width direction of the theoretical display area, and wherein
Step S1 comprises: controlling the second predetermined pattern to move from one side to the other side of an area corresponding to the first predetermined pattern;
Step S2 comprises: measuring the luminance of a plurality of predetermined positions and recording a time at which each of predetermined positions reaches the first predetermined luminance;
Step S3 comprises: determining that the second predetermined pattern does not match with the theoretical display area under the condition the at least two predetermined positions having the connecting line parallel to the width direction of the theoretical display area reach the first predetermined luminance at different time; and determining that the second predetermined pattern matches with the theoretical display area under the condition the at least two predetermined positions having the connecting line parallel to the width direction of the theoretical display area reach the first predetermined luminance at the same time; and
Step S4 comprises: rotating the lens of the projector about the axis of the lens of the projector.

In one embodiment of the present disclosure, the projection parameter comprises a position of the lens of the projector, the predetermined patterns include a third predetermined pattern which has a second predetermined luminance and a shape similar to the theoretical display area, and the third predetermined pattern covers all the plurality of predetermined positions;
Step S1 comprises: controlling the third predetermined pattern to be gradually reduced until there is a predetermined position where a third predetermined luminance less than the second predetermined luminance is reached in the plurality of predetermined positions;
Step S2 comprises: measuring the luminance of the plurality of predetermined positions and recording a time at which each of predetermined positions reaches the third predetermined luminance;
Step S3 comprises: determining that the third predetermined pattern does not match with the theoretical display area under the condition the plurality of predetermined positions reach the third predetermined luminance at different time; and determining that the third predetermined pattern matches with the theoretical display area under the condition the plurality of predetermined positions reach the third predetermined luminance at the same time; and Step S4 comprises: translating the lens of the projector in a direction towards the predetermined position that first reaches the third predetermined luminance.

In one embodiment of the present disclosure, the plurality of predetermined positions define a shape that is concentric with and geometrically similar to the theoretical display area.

In one embodiment of the present disclosure, the theoretical display area is in a rectangular shape, the number of predetermined positions is three, and the three predetermined positions are located at three different corners of the theoretical display area, respectively.

In one embodiment of the present disclosure, the method for projection parameter adjustment further comprises: providing a prompt message under the condition the predetermined patterns do not match with the theoretical display area.

As another aspect of the present disclosure, there is provided a device for projection parameter adjustment, comprising:

a display control circuit, configured to control a projector to display a plurality of predetermined patterns in accordance with a plurality of predetermined display conditions corresponding to the plurality of predetermined patterns, each of predetermined patterns corresponding to a projection parameter;

a luminance acquisition circuit, configured to measure luminance of a plurality of predetermined positions in a theoretical display area of the projector in accordance with the predetermined measurement condition;

a matching judgment circuit, configured to judge whether the predetermined patterns match with the theoretical display region in accordance with the luminance of the plurality of predetermined positions;

a control circuit, configured to generate an adjustment signal for adjusting the projector under the condition a judgment result indicating a mismatch is received from the matching judgment circuit and generate an enabled signal for controlling operation of the luminance acquisition circuit after the adjustment signal is generated; and a drive circuit, configured to adjust operation of the projector in accordance with the adjustment signal output from the control circuit.

In one embodiment of the present disclosure, the projection parameter comprises a position where the projector is placed, and the predetermined patterns comprise a first predetermined pattern in a rectangular shape having a first predetermined luminance, and wherein the display control circuit is configured to directly display the first predetermined pattern in accordance with a predetermined display condition corresponding to the first predetermined pattern, the luminance acquisition circuit is configured to measure the respective luminance of predetermined positions, the matching judgment circuit is configured to generate a first judgment result indicating that the first predetermined pattern does not match with the theoretical display area under the condition there is a position in a plurality of predetermined positions where the luminance is less than the first predetermined luminance, or to generate a judgment result indicating that the first predetermined pattern matches with the theoretical display area under the condition the luminance of the plurality of predetermined positions is greater than or equal to the first predetermined luminance, and the control circuit is configured to generate a placement position adjustment signal for adjusting the position where the projector is placed under the condition the first judgment result is received.

In one embodiment of the present disclosure, the projection parameter comprises an angle at which the lens of the projector rotates about an axis of the lens, the predetermined patterns comprise a second predetermined pattern which is a part of the first predetermined pattern, and a connecting line of at least two of the plurality of predetermined positions is parallel to a width direction of the theoretical display area, and wherein the display control circuit is configured to, in accordance with a predetermined display condition corresponding to the second predetermined pattern, control the second predetermined pattern to move from one side to the other side of the area corresponding to the first predetermined pattern, the luminance acquisition circuit is configured to measure the luminance of a plurality of predetermined positions and record the time at which each of predetermined positions reaches the first predetermined luminance, the matching judgment circuit is configured to generate a second judgment result indicating that the second predetermined pattern does not match with the theoretical display area under the condition the at least two predetermined positions having the connecting line parallel to the width direction of the theoretical display area reach the first predetermined luminance at different time, or to generate a judgment result indicating that the second predetermined pattern matches with the theoretical display area under the condition the at least two predetermined positions having the connecting line parallel to the width direction of the theoretical display area reach the first predetermined luminance at the same time, and the control circuit is configured to generate a rotation adjustment signal for controlling rotation of the lens of the projector about the axis of the lens under the condition the second judgment result is received.

In one embodiment of the present disclosure, the projection parameter comprises a position of the lens of the projector, the predetermined pattern comprise a third predetermined pattern having a second predetermined luminance and a shape similar to the theoretical display area, and third predetermined pattern covers all the predetermined positions, the display control circuit is configured to, in accordance with the predetermined display condition corresponding to the third predetermined pattern, control the third predetermined pattern to be gradually reduced until there is a predetermined position where a third predetermined luminance less than the second predetermined luminance is reached in the plurality of predetermined positions, the luminance acquisition circuit is configured to measure the luminance of the plurality of predetermined positions and record the time at which each of predetermined positions reaches the third predetermined luminance, the matching judgment circuit is configured to generate a third judgment result indicating that the third predetermined pattern does not match with the theoretical display area under the condition the plurality of predetermined positions reach the third predetermined luminance at different time, or to generate a judgment result indicating that the third predetermined pattern matches with the theoretical display area under the condition the plurality of predetermined positions reach the third predetermined luminance at the same time, and the control circuit is configured to generate a lens position adjustment signal for controlling the lens of the projector to translate in a direction toward a predetermined position that first reaches the third predetermined luminance under the condition the third judgment result is received.

In one embodiment of the present disclosure, the device for projection parameter adjustment further comprises an alarm circuit configured to generate a prompt message under the condition the judgment result indicating that the predetermined patterns do not match with the theoretical display area is received from the matching judgment circuit.

In one embodiment of the present disclosure, the device for projection parameter adjustment further comprises a communication circuit configured to transmit the adjustment signal output from the control circuit to the drive circuit.

In one embodiment of the present disclosure, the device for projection parameter adjustment further comprises a luminance sensor which is in connection with the luminance acquisition circuit and is configured to detect the luminance.

As still another aspect of the present disclosure, there is provided a projection apparatus comprising the device for projection parameter adjustment as set forth above in the present disclosure.

BRIEF DESCRIPTION OF THE DRAWINGS

Accompanying drawings are provided for further understanding of the present disclosure and constitute a part of the specification. Hereinafter, these drawings are intended to explain the present disclosure together with the following specific embodiments, but should not be considered as a limitation of the present disclosure. In which.

DETAILED DESCRIPTION OF THE EMBODIMENTS

Hereinafter, specific embodiments of the present disclosure will be described in detail in conjunction with the accompanying drawings. It should be understood that the specific embodiments as set forth herein are merely for the purpose of illustration and explanation of the present disclosure and should not be constructed as a limitation thereof.

Figure 1:
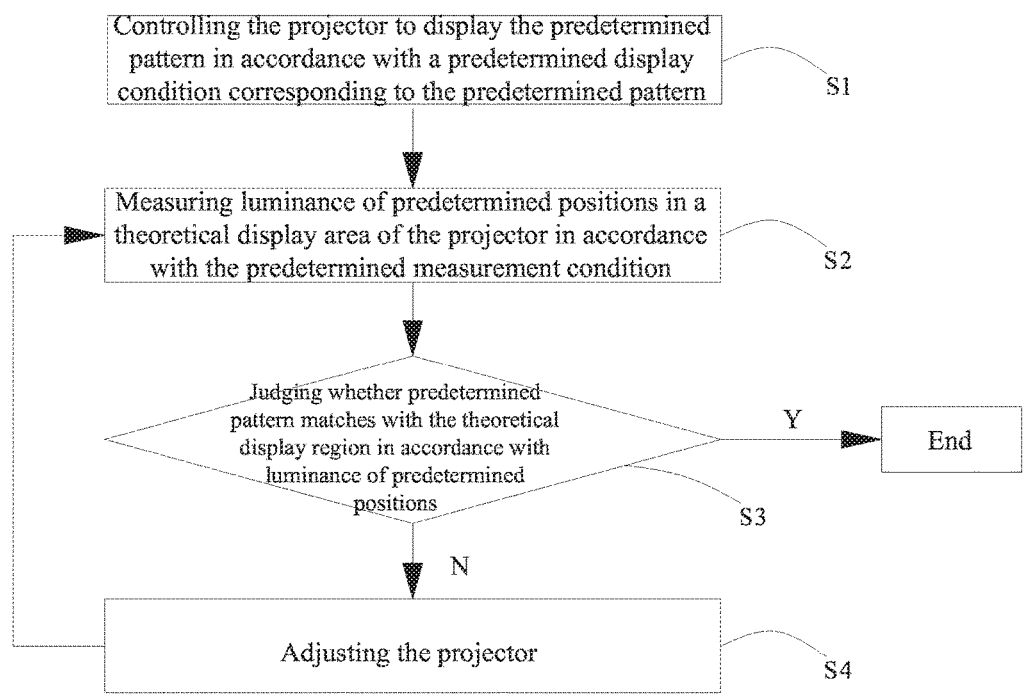
FIG. 1 is a flow chart of a method for projection parameter adjustment according to the present application.

According to an embodiment of the present disclosure, there is provided a method for projection parameter adjustment, comprising: adjusting a projector in accordance with a plurality of predetermined patterns sequentially, wherein each of the predetermined patterns corresponds to a projection parameter, and for each predetermined pattern, as shown in FIG. 1, the step of adjusting the projector according to the predetermined pattern includes:

Step S1, controlling the projector to display the predetermined pattern in accordance with a predetermined display condition corresponding to the predetermined pattern;

Step S2, measuring the luminance of a plurality of predetermined positions in a theoretical display area of the projector in accordance with the predetermined measurement condition;

Step S3, judging whether the predetermined pattern match with the theoretical display region in accordance with the luminance of the plurality of predetermined positions; and Step S4, under the condition the predetermined pattern does not match with the theoretical display area, adjusting the projector and repeating Step S1 to Step S3 until the predetermined pattern matches with the theoretical display area.

Figure 2:
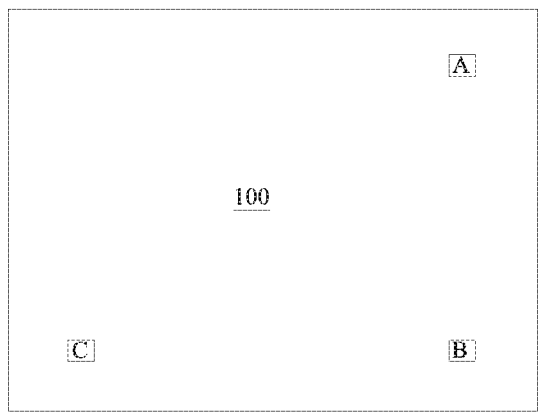
FIG. 2 is a diagram showing a positional relationship of a theoretical display area.

It should be understood that in the embodiment of the present disclosure, the luminance and shape of any one of the predetermined patterns are already set. For the projector, if it is correctly installed, the theoretical display area thereof will be fixed, and the luminance within the theoretical display area will be very easy to measure. For example, a luminance sensor could be used to measure the luminance of the theoretical display area. In the embodiment of the present disclosure, the theoretical display area is not particularly limited. For example, as shown in FIG. 2, the theoretical display area may be a region defined by a projection screen 100.

Also, different predetermined patterns correspond to different display conditions. Each predetermined pattern corresponds to a projection parameter of the projector. The projection parameter corresponding to the predetermined pattern reaches a good state after the projector is adjusted according to a predetermined pattern. Also, when the projector is adjusted according to other predetermined patterns, the projection parameters that have been adjusted to the preferred state are not affected.

For any one of the predetermined patterns, when the predetermined pattern matches with the theoretical display area, it indicates that the installation position of the projector for the predetermined pattern is correct, and at this time, the adjustment of the projector in accordance with the predetermined pattern can be stopped. When the projector is adjusted in accordance with all the predetermined patterns, the installation position of the projector for the predetermined patterns is correct. At this time, it can be concluded that the installation position of the projector is correct. According to the method provided in the present disclosure, an installation position of the projector can be automatically adjusted, such that the adjustment accuracy can be improved and the adjustment time can be reduced.

Here, the "the installation position of projector is correct" means that the projection parameters of the projector are in a correct state. According to an embodiment of the present disclosure, the projection parameters of the projector may include one or more of the placement position of the projector, the angle at which the lens of the projector is rotated about the axis of the lens, and the position of the lens of the projector.

In the use of the projector to display, a correct imaging area is determined. Under the condition the projector is correctly placed, a projection image generated by the projector may be located within the correct imaging area.

In the use of the projector to display, an angle of the projection image rotated in relation to an image source (e.g., an image displayed by the computer) is determined by the angle at which the lens of the projector is rotated about the axis of the lens. In order to obtain a good display effect, the angle of the projection image rotated in relation to the image source may be 0°. The angle 0° of the projection image rotated in relation to the image source can be achieved by adjusting the angle at which the lens of the projector is rotated about the axis of the lens.

In the use of the projector to display, a correct position of the projection image is also determined. By adjusting the position of the lens of the projector, the projection image can be positioned at the correct position.

In the embodiment of the present disclosure, there is no particular restriction on the number and the location of the predetermined position in the theoretical display area. In general, the theoretical display area is in a rectangular shape.

In one embodiment of the present disclosure, there may be three predetermined positions which are located at three different corners of the theoretical display area, respectively. As shown in FIG. 2, the predetermined positions may be a position A, a position B, and a position C provided at three corners of a projection screen 100.

Figure 3:
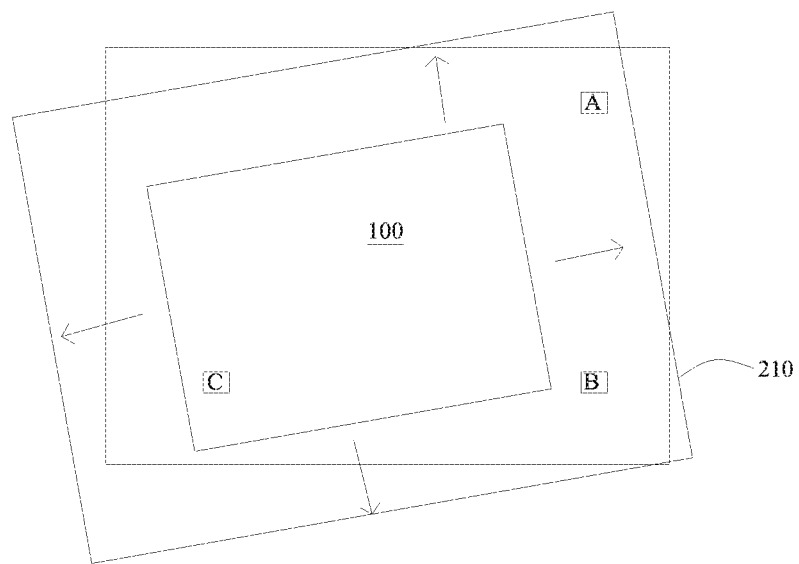
FIG. 3 is a diagram showing a positional relationship between a first predetermined pattern and a theoretical display area.

As described above, the projection parameters corresponding to different predetermined patterns are different. The projection parameters may include the position where the projector is placed. Accordingly, as shown in FIG. 3, the predetermined pattern may include a first predetermined pattern 210 in a rectangular shape having a first predetermined luminance.

Accordingly, at Step S1, the predetermined display condition corresponding to the first predetermined pattern 210 is to control the projector to display the first predetermined pattern under the condition the projector is in a state of the maximum focal length. That is, the first predetermined pattern 210 displayed in this state has a largest size.

At Step S2, the step of measuring luminance of a plurality of predetermined positions in a theoretical display area of the projector in accordance with a predetermined measurement condition includes measuring the luminance of each predetermined position, respectively. For any one of the predetermined positions, under the condition the predetermined position is within the first predetermined pattern 210, the luminance of the predetermined position is in the maximum luminance Lmax; and under the condition the predetermined position is outside the first predetermined pattern 210, the luminance of the predetermined position is in the minimum luminance Lmin.

Accordingly, Step S3 comprises:

determining that the first predetermined pattern does not match with the theoretical display area under the condition there is a position in the plurality of predetermined positions where the luminance is less than the first predetermined luminance; and determining that the first predetermined pattern matches with the theoretical display area under the condition the luminance of the plurality of predetermined positions is greater than or equal to the first predetermined luminance.

Under the condition there is a position where the luminance is less than the first predetermined luminance in the plurality of predetermined positions, it indicates that a large deviation occurs between the position where the projector is placed and an ideal position, and it is necessary to carry out Step S4. That is, at Step S4, the step of adjusting the projector includes: adjusting the position where the projector is placed.

Under the condition the luminance of the plurality of predetermined positions is greater than or equal to the first predetermined luminance, it indicates that the position where the projector is placed is close to the ideal position without having to adjust the placement position of the projector.

The adjustment of the projector according to the first predetermined pattern 210 may be referred to as pre-adjustment. After the pre-adjustment, the placement position of the projector is correct.

Figure 4:
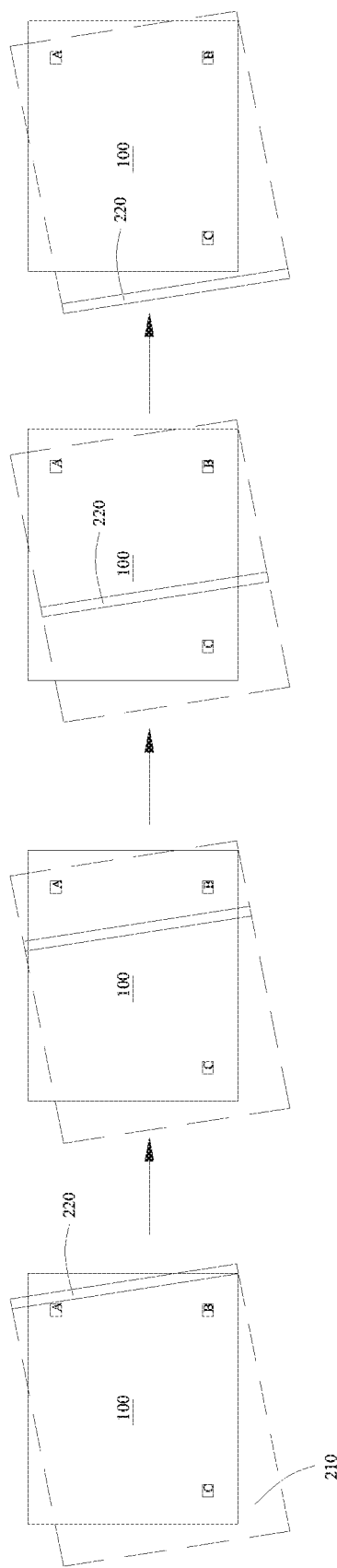
FIG. 4 is a schematic diagram showing a second predetermined pattern displayed in accordance with a display condition corresponding to the second predetermined pattern.

In one embodiment of the present disclosure, the projection parameters may further comprise an angle at which the lens of the projector rotates about the axis of the lens. Accordingly, as shown in FIG. 4, the predetermined pattern may include a second predetermined pattern 220 which is a part of the first predetermined pattern 210 (the portion indicated by the dotted line in FIG. 4). That is, the second predetermined pattern 220 is a rectangular strip, a length of the second predetermined pattern 220 is a width of the first predetermined pattern 210, and a width of the second predetermined pattern 220 is a part of a length of the first predetermined pattern 210. A connecting line of at least two predetermined positions in the plurality of predetermined positions is parallel to the width direction of the theoretical display area.

Step S1 includes: controlling the second predetermined pattern 220 to move from one side to the other side of an area corresponding to the first predetermined pattern 210.

Accordingly, Step S2 includes: measuring the luminance of a plurality of predetermined positions within the theoretical display area of the projector and recording a time at which each of predetermined positions reaches the first predetermined luminance.

Accordingly, Step S3 includes:

determining that the second predetermined pattern does not match the theoretical display area under the condition the at least two predetermined positions having the connecting line parallel to the width direction of the theoretical display area reach the first predetermined luminance at different time; and determining that the second predetermined pattern matches with the theoretical display area under the condition the at least two predetermined positions having the connecting line parallel to the width direction of the theoretical display area reach the first predetermined luminance at the same time.

As shown in FIG. 4, the width direction of the theoretical display area is the vertical direction in FIG. 4. A connecting line between the predetermined position A and the predetermined position B is parallel to the width direction of the theoretical display area. As shown in FIG. 4, the second predetermined pattern 220 is moved from one side to the other side of the area corresponding to the first predetermined pattern 210. As shown in FIG. 4, if the time at which the predetermined position A reaches the first predetermined luminance is different from the time at which the predetermined position B reaches the first predetermined luminance, it indicates that the connecting line between the predetermined position A and the predetermined position B is not parallel to the width direction of the area corresponding to the first predetermined pattern 210. That is, the first predetermined pattern 210 is rotated by an angle relative to the theoretical display area.

Accordingly, Step S4 comprises: rotating the lens of the projector about the axis of the lens of the projector. After the lens is rotated, the projection image is rotated accordingly. It should be explained that the rotation of the lens herein does not mean adjusting the focal length of the projector.

"Two predetermined positions having the connecting line parallel to the width direction of the theoretical display area reach the first predetermined luminance at different time" includes two cases. In the first case, the first predetermined position A at the upper right corner first reaches the first predetermined luminance. As shown in FIG. 4, in this regard, it is necessary to rotate the lens in a clockwise direction at Step S4. In the second case, the predetermined position B at the lower right corner first reaches the first predetermined luminance. In this regard, it is necessary to rotate the lens in a counter-clockwise direction at Step S4.

After the projector is adjusted in accordance with the second predetermined pattern, the rotation angle of the lens of the projector is in a good state, so that the displayed image is not rotated with respect to an image source.

Figure 5:
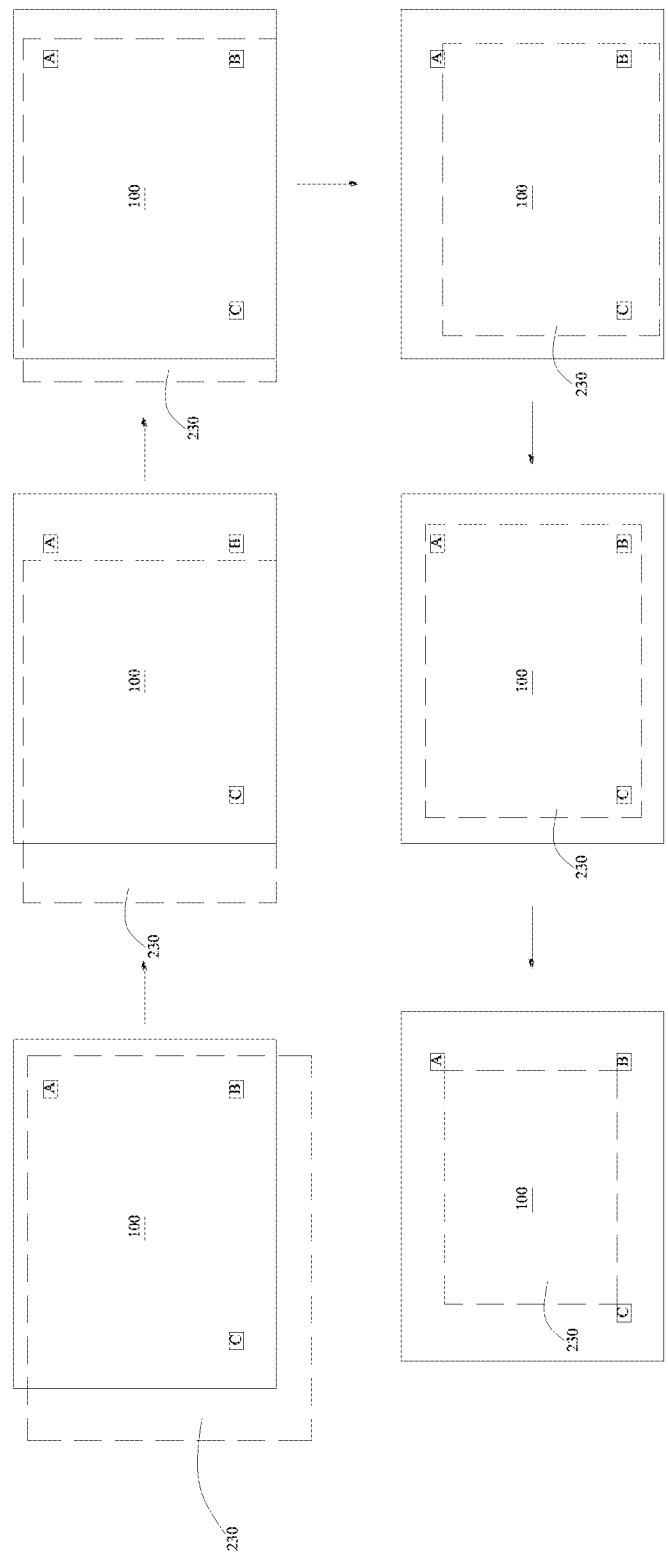
FIG. 5 is a schematic diagram showing the projector adjustment according to a third predetermined pattern.

The projection parameter may also include a position of the lens of the projector, and accordingly, as shown in FIG. 5, the predetermined pattern includes a third predetermined pattern 230 which has a second predetermined luminance and a shape similar to the theoretical display area, and which covers all the predetermined positions. The plurality of predetermined positions can define a shape that is concentric with and geometrically similar to the theoretical display area.

Step S1 includes: controlling the third predetermined pattern 230 to be gradually reduced until there is a predetermined position where a third predetermined luminance less than the second predetermined luminance is reached in the plurality of predetermined positions;

Step S2 includes: measuring the luminance of the plurality of predetermined positions and recording a time at which each of predetermined positions reaches the third predetermined luminance;

Step S3 includes:
determining that the third predetermined pattern does not match with the theoretical display area under the condition the plurality of predetermined positions reach the third predetermined luminance at different time; and
determining that the third predetermined pattern matches with the theoretical display area under the condition the plurality of predetermined positions reach the third predetermined luminance at the same time; and
Step S4 includes: translating the lens of the projector in a direction towards the predetermined position that first reaches the third predetermined luminance.

As shown in FIG. 5, under the condition the predetermined position A and the predetermined position B first reach the third predetermined luminance, the lens of the projector is translated to the right.

The third predetermined pattern 230 is further reduced. The third predetermined image 230 is moved upward under the condition the predetermined position A first reaches the third predetermined luminance.

The third predetermined pattern 230 is further reduced. Under the condition all the predetermined positions reach the third predetermined luminance at the same time, it indicates that the lens of the projector is in an optimized position.

In order to facilitate reminding the operator, in one embodiment of the present disclosure, the method further comprises: providing a prompt message under the condition the predetermined patterns do not match with the theoretical display area. Having received the prompt message, the operator can know that the installation status of the projector is not correct.

Figure 6:
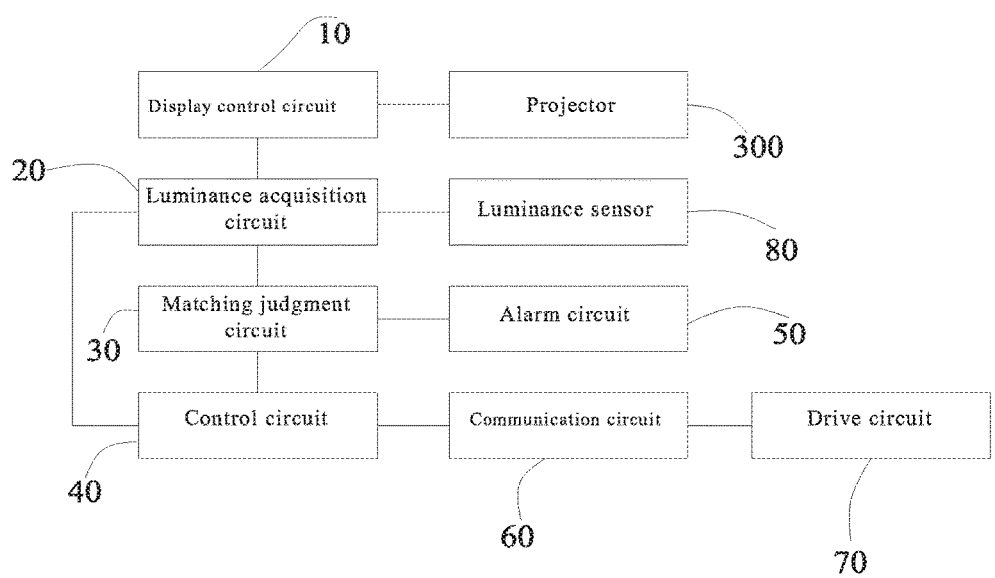
FIG. 6 is a schematic block diagram of a device for projection parameter adjustment according to the present application.

In one embodiment of the present disclosure, there is provided a device for projection parameter adjustment for a projector, wherein, as shown in FIG. 6, the device for projection parameter adjustment comprises:

a display control circuit 10, configured to control a projector 300 to display a plurality of predetermined patterns in accordance with a plurality of predetermined display conditions corresponding to the plurality of predetermined patterns, each of predetermined patterns corresponding to a projection parameter;

a luminance acquisition circuit 20, configured to measure the luminance of a plurality of predetermined positions in a theoretical display area of the projector 300 in accordance with the predetermined measurement condition;

a matching judgment circuit 30, configured to judge whether the predetermined patterns match with the theoretical display region in accordance with the luminance of the plurality of predetermined positions;

a control circuit 40, configured to generate an adjustment signal for adjusting the projector 300 under the condition a judgment result indicating a mismatch is received from the matching judgment circuit and to generate an enabled signal for controlling operation of the luminance acquisition circuit 20 after the adjustment signal is generated; and a drive circuit 70, configured to adjust operation of the projector in accordance with the adjustment signal output from the control circuit 40.

In the present disclosure, the display control circuit 10 may be configured to execute Step S1, the luminance acquisition circuit 20 may be configured to execute Step S2, the matching judgment circuit 30 may be configured to execute Step S3, and the control circuit 40 may be configured to execute Step S4. However, the present disclosure is not limited thereto.

In the present disclosure, an input end of the luminance acquisition circuit 20 is connected to an output end of a luminance sensor that detects the luminance of the theoretical display area. The control circuit 40 sends the corresponding adjustment signal to the drive circuit 70 for performing relevant actions.

In one embodiment of the present disclosure, the theoretical display area is in a rectangular shape and there are three the predetermined positions which are located at three different corners of the theoretical display area, respectively.

In one embodiment of the present disclosure, the projection parameters can include a position where the projector 300 is placed, and the predetermined patterns can comprise a first predetermined pattern in a rectangular shape having a first predetermined luminance.

The predetermined display condition corresponding to the first predetermined pattern is in that the first predetermined pattern is directly displayed, wherein the display control circuit 10 controls the projector 300 to directly display the first predetermined pattern.

Accordingly, the luminance acquisition circuit 20 can measure the respective luminance of predetermined positions.

The matching judgment circuit 30 is configured to generate a first judgment result indicating that the first predetermined pattern does not match with the theoretical display area under the condition there is a position in a plurality of predetermined positions where the luminance is less than the first predetermined luminance; or to generate a judgment result indicating that the first predetermined pattern matches with the theoretical display area under the condition the luminance of the plurality of predetermined positions is greater than or equal to the first predetermined luminance.

The control circuit 40 generates a placement position adjustment signal for adjusting the position where the projector 300 is placed under the condition the first judgment result is received.

In one embodiment of the present disclosure, the projection parameters can include an angle at which the lens of the projector 300 rotates about an axis of the lens, and the predetermined pattern can comprise the second predetermined pattern which is a part of the first predetermined pattern. A connecting line of at least two of the plurality of predetermined positions is parallel to a width direction of the theoretical display area.

The predetermined display condition corresponding to the second predetermined pattern is in that the second predetermined pattern is controlled to move from one side to the other side of the area corresponding to the first predetermined pattern.

The luminance acquisition circuit 20 can measure the luminance of a plurality of predetermined positions and record the time at which each of predetermined positions reaches the first predetermined luminance.

The matching judgment circuit 30 is configured to generate a second judgment result indicating that the second predetermined pattern does not match with the theoretical display area under the condition the at least two predetermined positions having the connecting line parallel to the width direction of the theoretical display area reach the first predetermined luminance at different time, or to generate a judgment result indicating that the second predetermined pattern matches with the theoretical display area under the condition the at least two predetermined positions having the connecting line parallel to the width direction of the theoretical display area reach the first predetermined luminance at the same time.

The control circuit 40 can generate a rotation adjustment signal for controlling rotation of the lens of the projector 300 about the axis of the lens under the condition the second judgment result is received.

In one embodiment of the present disclosure, the projection parameters can include a position of the lens of the projector 300, and the predetermined pattern may comprise a third predetermined pattern having a second predetermined luminance and a shape similar to the theoretical display area. The third predetermined pattern can cover all the predetermined positions. The plurality of predetermined positions can define a shape that is concentric with and geometrically similar to the theoretical display area.

The predetermined display condition corresponding to the third predetermined pattern is in that the third predetermined pattern is controlled to be gradually reduced until there is a predetermined position where a third predetermined luminance less than the second predetermined luminance is reached in the plurality of predetermined positions.

The luminance acquisition circuit 20 is configured to measure the luminance of the plurality of predetermined positions and record the time at which each of predetermined positions reaches the third predetermined luminance.

The matching judgment circuit 30 is configured to generate a third judgment result indicating that the third predetermined pattern does not match with the theoretical display area under the condition the plurality of predetermined positions reach the third predetermined luminance at different time, or to generate a judgment result indicating that the third predetermined pattern matches with the theoretical display area under the condition the plurality of predetermined positions reach the third predetermined luminance at the same time.

The control circuit 40 is configured to generate a lens position adjustment signal for controlling the lens of the projector 300 to translate in a direction toward a predetermined position that first reaches the third predetermined luminance under the condition the third judgment result is received.

In one embodiment of the present disclosure, the device for projection parameter adjustment further comprises an alarm circuit 50 configured to generate a prompt message under the condition the judgment result indicating that the predetermined patterns do not match with the theoretical display area is received from the matching judgment circuit 30.

The prompt message may include an optical and/or acoustic signal, and accordingly, the alarm circuit 50 may include an alarm light for generating an optical signal and/or an electric bell for generating an acoustic signal. Optionally, the alarm light can be LED, and the bell can be a speaker or buzzer.

In one embodiment of the present disclosure, the device for projection parameter adjustment further comprises a communication circuit 60 configured to transmit the adjustment signal output from the control circuit 40 to the drive circuit 70. The drive circuit 70 can perform the adjustment operation of the projector according to the adjustment signal output from the control circuit 40.

In one embodiment of the present disclosure, the communication circuit 60 may transmit the adjustment signal to the drive circuit 70 in a wireless (e.g., Wi-Fi signal, infrared signal, etc.) or wired (e.g., a cable) manner. Optionally, the communication circuit 60 may be a Wi-Fi communication module, an infrared communication module, or a Bluetooth communication module.

The drive circuit 70 may include a plurality of servomotors. Specifically, under the condition receiving an adjustment signal for adjusting the position where the projector 300 is placed, the drive circuit 70 can drive the projector 300 to translate; under the condition receiving an adjustment signal for controlling the lens of the projector 300 to rotate about the axis of the lens, the drive circuit 70 can drive the lens of the projector 300 to rotate about the axis of the lens; and under the condition receiving an adjustment signal for controlling the lens of the projector 300 to translate in a direction toward a predetermined position that first reaches the third predetermined luminance, the drive circuit 70 can control the lens of the projector 300 to translate in the direction toward the predetermined position that first reaches the third predetermined luminance.

In the present disclosure, the acquisition of the luminance of the predetermined positions is not particularly limited. For example, the device for projection parameter adjustment may further include a luminance sensor 80 for detecting the luminance, and an output end of the luminance sensor 80 is connected to an input end of the luminance acquisition circuit 20.

Of course, the present disclosure is not limited thereto. For example, the luminance acquisition circuit 20 may determine the luminance at a predetermined position by taking a photograph by an imaging device to calculate a gray-scale value of the photograph at the predetermined position.

In the present disclosure, the display control circuit 10 may be implemented by a digital signal processor (DSP) with display control functions, or by a graphics processor (GPU), and also controlled by a central processing circuit (CPU).

In the present disclosure, the matching judgment circuit 30 may be implemented by a CPU or by a DSP, a programmable logic array (FPGA), a microcontroller (MCU) and an integrated circuit (ASIC).

In the present disclosure, the control circuit 40 may be implemented by a CPU or by a DSP, a programmable logic array (FPGA), a microcontroller (MCU) and an integrated circuit (ASIC).

As a further aspect of the present disclosure, there is provided a projection apparatus comprising the device for projection parameter adjustment according to the present disclosure.

In one embodiment of the present disclosure, the display control circuit 10, the communication circuit 60, the drive circuit 70, the matching judgment circuit 30 may be disposed on a projector side. The luminance acquisition circuit 20 can be disposed on a display position side. For example, under the condition the projection apparatus includes a projection screen, the luminance acquisition circuit 20 may be disposed on the projection screen.

In order to improve an integration degree of the device for projection parameter adjustment, the display control circuit 10, the matching judgment circuit 30 and the communication circuit 60 can be integrated on one chip.

It should be understood that the above implementations are merely exemplary embodiments for the purpose of illustrating the principle of the present disclosure, and the present disclosure is not limited thereto. Various modifications and improvements can be made by a person having ordinary skill in the art without departing from the spirit and the essence of the present disclosure. Accordingly, all of the modifications and improvements also fall into the protection scope of the present disclosure.

The invention claimed is:

1. A method for projection parameter adjustment, comprising: adjusting a projector in accordance with a plurality of predetermined patterns sequentially, wherein each of the predetermined patterns corresponds to a projection parameter, the projection parameter includes one or more of a position where the projector is placed, an angle at which a lens of the projector is rotated about an axis of the lens and a position of the lens of the projector, and for each predetermined pattern, the step of adjusting the projector according to the predetermined pattern includes:
   Step S1, controlling the projector to display the predetermined pattern in accordance with a predetermined display condition corresponding to the predetermined pattern;
   Step S2, measuring luminance of a plurality of predetermined positions in a theoretical display area of the projector in accordance with the predetermined measurement condition;
   Step S3, judging whether the predetermined pattern matches with the theoretical display region in accordance with the luminance of the plurality of predetermined positions; and
   Step S4, under the condition the predetermined pattern does not match with the theoretical display area, adjusting the projector and repeating Step S1 to Step S3 until the predetermined pattern matches with the theoretical display area.

2. The method for projection parameter adjustment according to claim 1, wherein the step of adjusting the projector comprises: adjusting the position where the projector is placed.

3. The method for projection parameter adjustment according to claim 1, wherein under the condition that the projection parameter comprises the position where the projector is placed, the predetermined patterns include a first predetermined pattern in a rectangular shape having a first predetermined luminance, and wherein
   Step S1 comprises: controlling the projector to display the first predetermined pattern under the condition the projector being in a state of the maximum focal length;
   Step S2 comprises: measuring the luminance of each predetermined position, respectively;
   Step S3 comprises: determining that the first predetermined pattern does not match with the theoretical display area under the condition there is a position in the plurality of predetermined positions where the luminance is less than the first predetermined luminance; and determining that the first predetermined pattern matches with the theoretical display area under the condition the luminance of the plurality of predetermined positions is greater than or equal to the first predetermined luminance.

4. The method for projection parameter adjustment according to claim 3, wherein under the condition that the projection parameter comprises the angle at which the lens of the projector rotates about the axis of the lens, the predetermined patterns include a second predetermined pattern which is a part of the first predetermined pattern, and a connecting line of at least two predetermined positions in the plurality of predetermined positions is parallel to the width direction of the theoretical display area, and wherein
   Step S1 comprises: controlling the second predetermined pattern to move from one side to the other side of an area corresponding to the first predetermined pattern;
   Step S2 comprises: measuring the luminance of a plurality of predetermined positions and recording a time at which each of predetermined positions reaches the first predetermined luminance;
   Step S3 comprises: determining that the second predetermined pattern does not match with the theoretical display area under the condition the at least two predetermined positions having the connecting line parallel to the width direction of the theoretical display area reach the first predetermined luminance at different time; and determining that the second predetermined pattern matches with the theoretical display area under the condition the at least two predetermined positions having the connecting line parallel to the width direction of the theoretical display area reach the first predetermined luminance at the same time; and
   Step S4 comprises: rotating the lens of the projector about the axis of the lens of the projector.

5. The method for projection parameter adjustment according to claim 4, wherein under the condition that the projection parameter comprises the position of the lens of the projector, the predetermined patterns include a third predetermined pattern which has a second predetermined luminance and a shape similar to the theoretical display area, and the third predetermined pattern covers all the plurality of predetermined positions;
   Step S1 comprises: controlling the third predetermined pattern to be gradually reduced until there is a predetermined position where a third predetermined luminance less than the second predetermined luminance is reached in the plurality of predetermined positions;
   Step S2 comprises: measuring the luminance of the plurality of predetermined positions and recording a time at which each of predetermined positions reaches the third predetermined luminance;
   Step S3 comprises: determining that the third predetermined pattern does not match with the theoretical display area under the condition the plurality of predetermined positions reach the third predetermined luminance at different time; and determining that the third predetermined pattern matches with the theoretical display area under the condition the plurality of predetermined positions reach the third predetermined luminance at the same time; and Step S4 comprises: translating the lens of the projector in a direction towards the predetermined position that first reaches the third predetermined luminance.

6. The method for projection parameter adjustment according to claim 5, wherein the plurality of predetermined positions define a shape that is concentric with and geometrically similar to the theoretical display area.

7. The method for projection parameter adjustment according to claim 1, wherein the theoretical display area is in a rectangular shape, a number of predetermined positions is three, and the three predetermined positions are located at three different corners of the theoretical display area, respectively.

8. The method for projection parameter adjustment according to claim 1, further comprising:

providing a prompt message under the condition the predetermined patterns do not match with the theoretical display area.

9. A device for projection parameter adjustment comprising:

a display control circuit, configured to control a projector to display a plurality of predetermined patterns in accordance with a plurality of predetermined display conditions corresponding to the plurality of predetermined patterns, each of predetermined patterns corresponding to a projection parameter, and the projection parameter including one or more of a position where the projector is placed, an angle at which a lens of the projector is rotated about an axis of the lens and a position of the lens of the projector;

a luminance acquisition circuit, configured to measure luminance of a plurality of predetermined positions in a theoretical display area of the projector in accordance with the predetermined measurement condition;

a matching judgment circuit, configured to judge whether the predetermined patterns match with the theoretical display region in accordance with the luminance of the plurality of predetermined positions;

a control circuit, configured to generate an adjustment signal for adjusting the projector under the condition a judgment result indicating a mismatch is received from the matching judgment circuit and generate an enabled signal for controlling operation of the luminance acquisition circuit after the adjustment signal is generated; and a drive circuit, configured to adjust operation of the projector in accordance with the adjustment signal output from the control circuit.

10. The device for projection parameter adjustment according to claim 9, wherein under the condition that the projection parameter comprises the position where the projector is placed, the predetermined patterns comprise a first predetermined pattern in a rectangular shape having a first predetermined luminance, and wherein the display control circuit is configured to directly display the first predetermined pattern in accordance with a predetermined display condition corresponding to the first predetermined pattern, the luminance acquisition circuit is configured to measure the respective luminance of predetermined positions, the matching judgment circuit is configured to generate a first judgment result indicating that the first predetermined pattern does not match with the theoretical display area under the condition there is a position in a plurality of predetermined positions where the luminance is less than the first predetermined luminance, or to generate a judgment result indicating that the first predetermined pattern matches with the theoretical display area under the condition the luminance of the plurality of predetermined positions is greater than or equal to the first predetermined luminance, and the control circuit is configured to generate a placement position adjustment signal for adjusting the position where the projector is placed under the condition the first judgment result is received.

11. The device for projection parameter adjustment according to claim 10, wherein under the condition that the projection parameter comprises the angle at which the lens of the projector rotates about an axis of the lens, the predetermined patterns comprise a second predetermined pattern which is a part of the first predetermined pattern, and a connecting line of at least two of the plurality of predetermined positions is parallel to a width direction of the theoretical display area, and wherein the display control circuit is configured to, in accordance with a predetermined display condition corresponding to the second predetermined pattern, control the second predetermined pattern to move from one side to the other side of the area corresponding to the first predetermined pattern, the luminance acquisition circuit is configured to measure the luminance of a plurality of predetermined positions and record the time at which each of predetermined positions reaches the first predetermined luminance, the matching judgment circuit is configured to generate a second judgment result indicating that the second predetermined pattern does not match the theoretical display area under the condition the at least two predetermined positions having the connecting line parallel to the width direction of the theoretical display area reach the first predetermined luminance at different time, or to generate a judgment result indicating that the second predetermined pattern matches with the theoretical display area under the condition the at least two predetermined positions having the connecting line parallel to the width direction of the theoretical display area reach the first predetermined luminance at the same time, and the control circuit is configured to generate a rotation adjustment signal for controlling rotation of the lens of the projector about the axis of the lens under the condition the second judgment result is received.

12. The device for projection parameter adjustment according to claim 11, wherein under the condition that the projection parameter comprises the position of the lens of the projector, the predetermined pattern comprise a third predetermined pattern having a second predetermined luminance and a shape similar to the theoretical display area, and third predetermined pattern covers all the predetermined positions, the display control circuit is configured to, in accordance with the predetermined display condition corresponding to the third predetermined pattern, control the third predetermined pattern to be gradually reduced until there is a predetermined position where a third predetermined luminance less than the second predetermined luminance is reached in the plurality of predetermined positions, the luminance acquisition circuit is configured to measure the luminance of the plurality of predetermined positions and record the time at which each of predetermined positions reaches the third predetermined luminance, the matching judgment circuit is configured to generate a third judgment result indicating that the third predetermined pattern does not match with the theoretical display area under the condition the plurality of predetermined positions reach the third predetermined luminance at different time, or to generate a judgment result indicating that the third predetermined pattern matches with the theoretical display area under the condition the plurality of predetermined positions reach the third predetermined luminance at the same time, and the control circuit is configured to generate a lens position adjustment signal for controlling the lens of the projector to translate in a direction toward a predetermined position that first reaches the third predetermined luminance under the condition the third judgment result is received.

13. The device for projection parameter adjustment according to claim 9, further comprising an alarm circuit configured to generate a prompt message under the condition the judgment result indicating that the predetermined patterns do not match with the theoretical display area is received from the matching judgment circuit.

14. The device for projection parameter adjustment according to claim 9, further comprising a communication circuit configured to transmit the adjustment signal output from the control circuit to the drive circuit.

15. The device for projection parameter adjustment according to claim 14, further comprising a luminance sensor which is in connection with the luminance acquisition circuit and is configured to detect the luminance.

16. A projection apparatus comprising a device for projection parameter adjustment, wherein the device for projection parameter adjustment comprises:

a display control circuit, configured to control a projector to display a plurality of predetermined patterns in accordance with a plurality of predetermined display conditions corresponding to the plurality of predetermined patterns, each of predetermined patterns corresponding to a projection parameter, and the projection parameter including one or more of a position where the projector is placed, an angle at which a lens of the projector is rotated about an axis of the lens and a position of the lens of the projector;

a luminance acquisition circuit, configured to measure luminance of a plurality of predetermined positions in a theoretical display area of the projector in accordance with the predetermined measurement condition;

a matching judgment circuit, configured to judge whether the predetermined patterns match with the theoretical display region in accordance with the luminance of the plurality of predetermined positions;

a control circuit, configured to generate an adjustment signal for adjusting the projector under the condition a judgment result indicating a mismatch is received from the matching judgment circuit and generate an enabled signal for controlling operation of the luminance acquisition circuit after the adjustment signal is generated; and a drive circuit, configured to adjust operation of the projector in accordance with the adjustment signal output from the control circuit.

* * * * *